(12) United States Patent
Takano et al.

(10) Patent No.: US 8,354,188 B2
(45) Date of Patent: Jan. 15, 2013

(54) POLYMER FOR LITHIUM ION SECONDARY BATTERY AND LITHIUM ION SECONDARY BATTERY USING SAME

(75) Inventors: Yasuo Takano, Nishinamiya (JP); Naoki Imachi, Kobe (JP); Seiji Yoshimura, Hirakata (JP); Shin Fujitani, Kobe (JP); Satoshi Nishikawa, Otsu (JP); Shinji Bessyo, Takatsuki (JP)

(73) Assignees: Sanyo Electric Co., Ltd., Osaka (JP); Sunstar Giken Kabushiki Kaisha, Takatsuki (JP)

( * ) Notice: Subject to any disclaimer, the term of this patent is extended or adjusted under 35 U.S.C. 154(b) by 1368 days.

(21) Appl. No.: 11/887,225

(22) PCT Filed: Mar. 10, 2006

(86) PCT No.: PCT/JP2006/304705
§ 371 (c)(1),
(2), (4) Date: Sep. 27, 2007

(87) PCT Pub. No.: WO2006/112206
PCT Pub. Date: Oct. 26, 2006

(65) Prior Publication Data
US 2009/0246635 A1 Oct. 1, 2009

(30) Foreign Application Priority Data
Mar. 30, 2005 (JP) .................... 2005-098258

(51) Int. Cl.
*H01M 2/16* (2006.01)
*H01M 2/08* (2006.01)

(52) U.S. Cl. ........................ 429/184; 429/249

(58) Field of Classification Search ............... 429/144, 429/249, 250, 253, 254
See application file for complete search history.

(56) References Cited

U.S. PATENT DOCUMENTS
2004/0157118 A1   8/2004   Uetani et al. .............. 429/144

FOREIGN PATENT DOCUMENTS

| JP | 2001-176555 A | 6/2001 |
|----|---------------|--------|
| JP | 2002-110245 A | 4/2002 |
| JP | 2002-270152 A | 9/2002 |
| JP | 2002-298820 A | 10/2002 |
| JP | 2003-142158 A | 5/2003 |
| JP | 2003-142159 A | 5/2003 |
| JP | 2003-346788 A | 12/2003 |
| JP | 2004-185920 A | 7/2004 |
| JP | 2004-335210 A | 11/2004 |

*Primary Examiner* — Patrick Ryan
*Assistant Examiner* — Muhammad Siddiquee
(74) *Attorney, Agent, or Firm* — Kubovcik & Kubovcik (57) ABSTRACT

A polymer for bonding the positive electrode and negative electrode of a lithium secondary battery, which includes a positive electrode, a negative electrode and an electrolyte solution, with a separator arranged between the positive electrode and the negative electrode. The polymer contains a cationically polymerizable monomer unit (A), a monomer unit (B) providing affinity to the electrolyte solution, a monomer unit (C) providing poor solubility to the electrolyte solution, and a monomer unit (D) containing an anionic or nonionic hydrophilic group. This polymer can be obtained through radical polymerization such as emulsion polymerization or suspension polymerization, and is characterized by having a dissolution rate into a mixed solvent of ethylene carbonate (EC) and diethyl carbonate (DEC) [EC:DEC=5:5 (weight ratio)] of not more than 10% by weight.

4 Claims, 1 Drawing Sheet

POLYMER FOR LITHIUM ION SECONDARY BATTERY AND LITHIUM ION SECONDARY BATTERY USING SAME

This application is a 371 of international application PCT/JP2006/304705 filed Mar. 10, 2006, which claims priority based on Japanese patent application No 2005-098258 filed Mar. 30, 2005, which is incorporated herein by reference.

TECHNICAL FIELD

The present invention relates to a polymer for lithium ion secondary batteries and to a lithium ion secondary battery using the polymer.

BACKGROUND ART

Along with developments of small-sized and high performance portable devices and a broadening of new applications, for example, HEV, there are two limited trends in lithium ion secondary batteries towards high capacity and high output. In any situation, an environment that is significantly increased in the calories generated inside of a battery and deteriorated in heat radiation is created inside of the battery. It is therefore necessary to improve the heat stability of battery materials in order to ensure the safety.

As for the improvement in the thermal stability of battery materials, many studies have been made about active materials involving studies of elemental substitution and a control of powder properties and about electrolytes involving studies of flame retardant solvents including ionic solvents.

However, with regard to a separator, a development of a thinner type is desired, but on the other hand, it is highly desired to improve its heat resistance in the case of attaining the above high capacity. It is difficult to make an improvement of a thinner type while retaining the safety function such as shutdown of the separator. Particularly, there is a problem that shrinkage is increased by raising higher temperatures in the development of a thinner type separator, and it is therefore difficult to make a balance between an improvement in the heat resistance of a separator and a development of a thinner type separator. For example, when a laminate structure is formed by laminating a heat resistant resin such as polypropylene (PP) on polyethylene (PE), thermal stability is improved. However, physical properties such as pore diameter and porosity are greatly changed in relation to the problem concerning each thickness of the both to be stuck and to production method and it is therefore difficult to provide the same performance as conventional separators.

In addition to the above, with regard to a gel polymer battery using a polyethylene (PE) separator, there is a report concerning a method for suppressing shrinkage by retaining the adhesion of a gel electrolyte between the separator and an electrode. However, though the effect for suppressing the thermal shrinkage of a separator by the adhesion is higher than that of an electrolyte battery because a gel polymer is more deteriorated in ion conductivity than the electrolyte battery, the gel polymer battery has a disadvantage in inclusion of a liquid and high-rate discharge and has a difficulty in meeting the performance required in the market.

With regard to the prevention of the thermal shrinkage of a separator by improving the adhesion between the separator and an electrode, it is necessary to use a polymer reduced in solubility in an electrolyte solution to secure adhesion in the electrolyte solution. However, in this case, the polymer layer is reduced in ion conductivity and therefore, a deterioration in battery characteristics is significant. In the case of using a polymer electrolyte which is easily gelled on the other hand, it is easily dissolved in the electrolyte solution and therefore only insufficient adhesion is obtained.

In such a situation, there have been the following patent applications using a polymer having an epoxy group or oxetanyl group: including applications in Patent References 1 and 2 using the polymer as a gel electrolyte, applications in Patent References 3 and 4 using the polymer for preventing short circuits from being developed in a separator and an application in Patent Reference 5 using the polymer to be applied to a separator for adhesion between the separator and an electrode.

An in-battery polymerization system in which all electrolyte solutions contained in a battery cell are gelled is adopted in Patent References 1 and 2 and a method in which an electrolyte solution containing a curing agent is poured on a separator which is coated or impregnated with a polymer having a crosslinking group containing an epoxy group or oxetanyl group in advance to crosslink the polymer to use it as a gel electrolyte is adopted in Patent References 3 and 4, thereby intending to limit the thermal shrinkage of the separator by the reinforcing effect of the crosslinked polymer. However, the former gives rise to the problem concerning a deterioration in ion conductivity, leading to a reduction in charge-discharge characteristics and the latter poses the problem concerning a reduction in adhesion and dissolution of the polymer in the electrolyte solution because the total amount of the polymer is lower for the electrolyte solution, giving rise to the problem that the generation of gas is increased because of storage at high temperatures or the like.

Also, Patent Reference 5 also discloses that a polymer is applied to a separator to bind an electrode with the separator. However, in this method, the polymer is dissolved in the electrolyte solution when the electrolyte solution is poured and therefore sufficient adhesive effect can be scarcely developed.

Some other polymer batteries adopting the in-battery polymerization system are disclosed. However, as mentioned above, the in-battery fully gelled type battery has poor ion conductivity and it is difficult to create sufficient charge-discharge performance in, particularly, a high-capacity battery. Also, as disclosed in Patent References 3, 4 and 5, a method is disclosed in which a crosslinking polymer is applied to a separator and an electrolyte solution containing a crosslinking agent is poured to obtain an adhesive effect. However, because it is necessary to use a polymer having high affinity to the electrolyte solution in a small amount (thin film) to attain the charge-discharge performance, it is dissolved in the electrolyte solution before the electrolyte solution containing a crosslinking agent is poured, posing the problem that only insufficient adhesive effect is obtained and the dissolved polymer adversely affects the charge-discharge performance of the battery.

Patent Reference 1: Publication of JP-A No. 2001-176555
Patent Reference 2: Publication of JP-A No. 2002-110245
Patent Reference 3: Publication of JP-A No. 2003-142158
Patent Reference 4: Publication of JP-A No. 2003-142159
Patent Reference 5: Publication of JP-A No. 2004-185920

SUMMARY OF THE INVENTION

It is an object of the present invention to provide a polymer for lithium ion secondary battery which is used to bind a positive electrode or a negative electrode and a separator disposed between the both and can limit the thermal shrinkage of a separator without deteriorating battery characteristics, making it possible to use a thinner separator, and a lithium ion secondary battery using the polymer.

According to a first aspect of the present invention, there is provided a polymer for lithium ion secondary battery which is used to bind a positive electrode and a negative electrode of a lithium ion secondary battery provided with the positive electrode, the negative electrode and an electrolyte solution with a separator disposed between the both electrodes, the polymer:

comprising (A) a monomer unit having cationic polymerization ability, (B) a monomer unit imparting affinity to the electrolyte solution, (C) a monomer unit imparting poor solubility in the electrolyte solution and (D) a monomer unit containing an anionic or nonionic hydrophilic group;

being obtained by radical polymerization based on emulsion polymerization or suspension polymerization; and having an elution rate of 10% by weight or less in a mixture solvent of ethylene carbonate (EC) and diethyl carbonate (DEC) having a weight ratio of EC:DEC=5:5, the elution rate being defined by the following equation.

Elution rate(wt %)=(Weight of the polymer eluted in the mixture solvent/Weight of the total polymer)×100

The monomer unit (C) is preferably, for example, a partially crosslinked unit in the polymer. Examples of such a polymer unit include a monomer unit $(C_1)$ obtained by crosslinking a polyfunctional radically polymerizable monomer. Specific examples of the monomer unit $(C_1)$ include monomer units constituted of a polyfunctional radically polymerizable monomer represented by the following formula 1.

[Chem. 1]

(Formula 1)

In the formula, $R^1$ represents —H or —$CH_3$, X represents a residual group of a hydroxyl group compound.

Also, examples of other monomer unit (C) in the present invention include a monomer unit $(C_2)$ constituted of a radically polymerizable monomer having a poorly soluble hydrocarbon group. Specific examples of the monomer unit (C2) include monomer units constituted of radically polymerizable monomers represented by the following formula 2.

[Chem. 2]

(Formula 2)

In the formula, $R^2$ represents —H or —$CH_3$ and $R^3$ represents at least one type of group consisting of an alkyl group having 8 or more carbon atoms, an alicyclic alkyl group having 8 or more carbon atoms and an alkyl-substituted alicyclic alkyl group having 8 or more carbon atoms.

According to a second aspect of the present invention, there is provided a polymer for lithium ion secondary batteries which is used to bind a positive electrode and a negative electrode of a lithium ion secondary battery provided with the positive electrode, the negative electrode and an electrolyte solution with a separator disposed between the both electrodes, the polymer:

comprising (A) a monomer unit having cationic polymerization ability, (B) a monomer unit imparting affinity to the electrolyte solution and (D) a monomer unit containing an anionic or nonionic hydrophilic group;

being obtained by radical polymerization based on emulsion polymerization or suspension polymerization; and having an elution rate of 10% by weight or less in a mixture solvent of ethylene carbonate (EC) and diethyl carbonate (DEC) having a weight ratio of EC:DEC=5:5, the elution rate being defined by the following equation, and being provided by forming at least a part of the monomer unit (A) through a radical polymerization of a radically polymerizable monomer having an alicyclic epoxy group, and by containing the radically polymerizable monomer.

Elution rate(wt %)=(Weight of the polymer eluted in the mixture solvent/Weight of the total polymer)×100

The polymer according to the second aspect of the present invention is characterized by an elution rate of 10% by weight or less by compounding a radically polymerizable monomer having an alicyclic epoxy group in the radical polymerization. Specifically, in the radical polymerization, a radically polymerizable monomer having an alicyclic epoxy group is contained to provide the polymer with a resistance to solubilization. Though this mechanism is not specifically clarified, it is considered that, probably, a part of alicyclic epoxy groups are ring-opened, whereby the polymer undergoes a certain crosslinking reaction in the radical polymerization. Therefore, it is inferred that the radically polymerizable monomer having an alicyclic epoxy group constitutes the monomer unit (C) used in the first aspect of the present invention in any form.

Matters common to the first and second aspects of the present invention will be explained as "the present invention".

Examples of the monomer unit (A) in the present invention include monomer units constituted of radically polymerizable monomers having an alicyclic epoxy group and/or radically polymerizable monomers having an oxetanyl group.

Specific examples of the radically polymerizable monomer having an alicyclic epoxy group include 3,4-epoxycyclohexylmethylacrylate or 3,4-epoxycyclohexylmethylmethacrylate represented by the following formula 3.

[Chem. 3]

(Formula 3)

In the formula, $R^4$ represents —H or —$CH_3$.

Specific examples of the radically polymerizable monomer having an oxetanyl group include oxetane acrylate or oxetane methacrylate represented by the following formula 4.

[Chem. 4]

(Formula 4)

In the formula, $R^5$ represents —H or —$CH_3$ and $R^6$ represents an alkyl group having 1 to 6 carbon atoms.

Specific examples of the monomer unit (B) in the present invention include units constituted of at least one monomer selected from an acrylic ester monomer and a methacrylic ester monomer represented by the following formula 5 and a vinyl ester monomer represented by the following formula 6.

[Chem. 5]

(Formula 5)

(Formula 6)

In the formula, $R^7$ represents —H or —$CH_3$, $R^8$ represents an alkyl group having 1 to 6 carbon atoms, —($CH_2CH_2O)_{1-3}CH_3$, —($CH_2CH_2O)_{1-3}C_2H_5$, —($CH_2CH(CH_3)O)_{1-3}CH_3$ or —($CH_2CH(CH_3)O)_{1-3}C_2H_5$ and $R^9$ represents —$CH_3$, —$C_2H_5$ or —$C_3H_7$.

The elution rate of the polymer in the present invention is one defined by the above equation and is found from the amount of the polymer eluted in the above mixture solvent after the polymer is dipped in the mixture solvent for 24 hours to carry out extracting treatment. The elution rate in the present invention shows the poor solubility of the polymer of the present invention in the electrolyte solution, and is preferably 10% by weight or less, more preferably 7% by weight or less and still more preferably 5% by weight or less.

However, it is not only required for the polymer of the present invention to be poorly soluble and it is preferable that even if the polymer is poorly soluble, it is one which is swelled and/or softened in the electrolyte solution. In view of this, the polymer of the present invention includes the monomer unit (B) that imparts affinity to the electrolyte solution.

The reason why the polymer of the present invention is preferably one which is swelled and/or softened in the electrolyte solution is as follows.

Specifically, it is necessary, in the present invention, to make the polymer undergo a crosslinking reaction by using a cationic initiator contained in the electrolyte solution after the polymer of the present invention is disposed in a battery. Accordingly, when the polymer is swelled and/or softened, cation polymerization is initiated by the cationic initiator contained in the electrolyte solution to cause the polymer to enter into a crosslinking reaction. Also, because the electrolyte solution exists in the polymer even after the crosslinking reaction, the movement of lithium ions is scarcely impeded, which minimizes deterioration in battery characteristics. Also, the swelling and softening of the polymer brings about the result that the polymer penetrating into between the electrode and the separator improves the adhesion between the both.

The polymer of the present invention is obtained as an emulsion or suspension of a particulate polymer by radical emulsion polymerization or radical suspension polymerization. This emulsion or suspension is (preferably) diluted and poured into the outer package of the battery to allow the polymer particles to be interposed between the positive and negative electrodes and the separator.

When the monomer having an alicyclic epoxy group is compounded in an amount of 1.0 to 40% by weight based on the total amount of the monomer to undergo radical emulsion polymerization or radical suspension polymerization in water, it is internally crosslinked simultaneously and partially, thereby achieving the purpose of the reaction. When the monomer having an alicyclic epoxy group is less than 1.0% by weight, the polymer is easily dissolved in the electrolyte solution, leading to a reduction in binding effect, whereas when the amount of the monomer exceeds 40% by weight, the degree of internal crosslinking becomes too large, so that the polymer particles are insufficiently fused during drying, bringing about reduced adhesiveness, which is undesirable, and also, the polymer is scarcely swelled in the electrolyte solution and there is therefore the case where battery characteristics are deteriorated, which is also undesirable.

As the radically polymerizable monomer containing an oxetanyl group, oxetanylacrylate or oxetanylmethacrylate represented by the above formula 4 is used. Though this monomer does not contribute to the internal crosslinking of the polymer particles, it is crosslinked by the cationic initiator (including $LiPF_6$ and $LIBF_4$) contained in the electrolyte solution which is to be poured afterward to contribute to the adhesiveness between the electrode and the separator.

The above alicyclic epoxy group-containing monomer is also crosslinked by the cationic initiator (including $LiPF_6$ and $LIBF_4$). Therefore, when the above radically polymerizable monomer is combined with the alicyclic epoxy group-containing monomer, the upper limit of the total amount of these monomers to be used is 40% by weight. When the alicyclic epoxy group-containing monomer is used, the above radically polymerizable monomer may be unnecessarily used. When the alicyclic epoxy group-containing monomer is not used, the above radically polymerizable monomer is used in an amount of 10% by weight to 40% by weight. When the amount is less than 10% by weight, the degree of crosslinking is so low that the polymer is easily dissolved in the electrolyte solution, bringing about insufficient adhesion, whereas when the amount exceeds 40% by weight, the polymer is scarcely swelled in the electrolyte solution and there is therefore the case where the characteristics of the battery are deteriorated, which is undesirable.

Also, a polymer which is poorly soluble in the electrolyte solution may be obtained by radically polymerizing a radically polymerizable monomer, containing a group, such as a long-chain alkyl group, imparting poor solubility in the electrolyte solution, for example, compounds represented by the above formula 2, such as long-chain alkyl acrylates or methacrylates having about 8 to 18 carbon atoms, alicyclic alkyl acrylates or methacrylates, or alkyl-substituted alicyclic alkyl acrylates or methacrylates. If these monomers are formulated in an amount of 10 to 70% by weight based on the total amount of monomers and subjected to radical polymerization, the purpose can be achieved. When the amount of these monomers is less than 10% by weight, the polymer is easily dissolved in the electrolyte solution, bringing about decreased binding effect, whereas when the amount exceeds 70% by weight, the polymer is scarcely swelled in the electrolyte solution and there is therefore the case where the characteristics of the battery are deteriorated, which is undesirable.

As the polyfunctional radically polymerizable monomer having two or more radically polymerizable groups in one molecule, a polyfunctional radically polymerizable monomer represented by the above formula 1, for example, diacrylates or methacrylates of alkylene glycols to polyalkylene glycols; ethylene glycol diacrylates, polyethylene glycol diacrylates, polyethylene glycol dimethacrylates, polypropylene glycol diacrylates, and polypropylene glycol dimethacrylates; trimethylolpropane, glycerin or alkylene oxide adducts of these compounds; trimethylolpropane triacrylates, trimethylolpropanetrimethacrylates, glycerin triacrylates, glycerin trimethacrylates, polyoxyethylene addition trimethylolpropane triacrylates and polyoxypropylene addition glycerin trimethacrylates; acrylates or methacrylates of oligo esters of excess equivalents of polyhydric alcohols and polybasic acids, for example, oligo esters of dibasic acids, such as adipic acid and sebacic acid, and glycols such as ethylene glycol, propylene glycol and neopentyl glycol; and acrylates or methacrylates of oligo esters of a residual carboxylic acid of polyγ-butyrolactone or a compound (its carboxyl group) such as hydroxypivalic acid having a hydroxyl group and a carboxyl group and polyhydric alcohols may be used. These monomers may be used in a relatively small amount ranging from 0.1 to 4% by weight. When the amount of these monomers is less than 0.1% by weight, the polymer is easily dissolved in the electrolyte solution, bringing about reduced binding effect whereas when the amount exceeds 4% by weight, too large degrees of internal crosslinking are obtained so that polymer particles are insufficiently fused during drying, and therefore, reduced adhesion is obtained, which is undesirable. Also, the polymer is scarcely swelled by the electrolyte solution and there is therefore the case where the characteristics of the battery are deteriorated, which is undesirable.

Even if, other than the above, polyfunctional radically polymerizable monomers, for example, polyfunctional vinyl, acrylic or allyl compounds such as divinyl benzene, diallylphthalate, triallyltrimellitate, triallylisocyanurate, allylmethacrylate and allylacrylate are used, the polymer can also be internally crosslinked.

Also, even if, besides these polyfunctional radically polymerizable monomers, polyfunctional mercapto compounds, ethylene glycol bisthioglycolate, butanediol bithioglycolate, trimethylolpropane tris-thioglycolate, pentaerythritol tetrakis-thioglycolate or the like are used, the polymer can also be internally crosslinked.

Of course, two or more of the above methods may be combined as the method of preventing the polymer from being dissolved in the electrolyte solution.

As mentioned above, the polymer which is poorly soluble in the electrolyte solution can be obtained using the above methods. Further, in order to adjust poor solubility in the electrolyte solution and adequate swelling ability, relatively highly polar acrylic ester monomers, methacrylic ester monomers or vinyl ester monomers which have high affinity to the electrolyte solution and are represented by the above formulae 5 and 6 are used. These monomers are used in an amount of 60 to 98% by weight based on the total amount of the monomers excluding the radically polymerizable monomer containing an alicyclic epoxy group in the case of using this radically polymerizable monomer to make the polymer poorly soluble in the electrolyte solution, in an amount of 10 to 80% by weight based on the total amount of the monomers excluding the radically polymerizable monomer containing a group imparting poor solubility in the electrolyte solution in the case of using the radically polymerizable monomer without using the radically polymerizable monomer containing an alicyclic epoxy group to form the polymer poorly soluble in the electrolyte solution and in an amount of 56 to 89.9% by weight based on the total amount of the monomers excluding the polyfunctional radically polymerizable monomer in the case of using the radically polymerizable monomer without using the radically polymerizable monomer containing an alicyclic epoxy group to form the polymer poorly soluble in the electrolyte solution.

These polymer particles can be appropriately manufactured in the form of a dispersion solution by in-water emulsion polymerization or in-water suspension polymerization. In this case, the emulsion polymerization may be carried out using a usual method. As the initiator, a water-soluble radical polymerization initiator may be used in an amount of about 0.01 to several wt % based on the total amount of the monomers, the initiator including persulfates such as sodium persulfate, potassium persulfate, ammonium persulfate and lithium persulfate; 2,2'-azobis(1-imino-2-ethylpropane)dihydrochloride, 2,2'-azobis[2-(2-imidazoline-2-yl)propane] and 2,2-azobis[2-methyl-N-(2-hydroethyl)propionamide]. Also, according to the need, oil-soluble radical initiators such as N,N'-azobisisobutyronitrile or benzoyl peroxide may be used in combination. As an emulsifier, various usual surfactants including anionic types such as alkyl sulfate, alkylbenzene sulfate or alkylnaphthalene sulfate; and nonionic types such as polyoxyethylene alkyl ether or polyoxyethylene alkylphenol ether; and in addition, compounds having a radically polymerizable group and an anionic hydrophilic group or a nonionic hydrophilic group and called a reactive emulsifier having a radically polymerizable group; alkali metal or ammonium salts of sulfoethylmethacrylate, alkali metal or ammonium salts of sulfoethylacrylate, alkali metal or ammonium salts of p-styrenesulfonic acid, polyethylene glycol methacrylate and polyethylene glycol acrylate may be used. It is, however, preferable to use the reactive emulsifier. Among these emulsifiers, the use of an anionic reactive emulsifier in which the anionic group is a lithium salt is more preferable and these reactive emulsifiers are used in an amount of about 0.1 to 20% by weight.

With regard to the condition of polymerization, the polymerization is carried out in the presence of water in an amount of 60 to 500% by weight based on the total amount of the monomers with introducing inert gas such as nitrogen gas and stirring. The polymerization is carried out by heating the system to a temperature of 50° C. to 80° C. for about 3 hours to 20 hours though the temperature differs depending on the half-life temperature of the radical initiator, and by adjusting the concentration of the polymer and the pH in the system according to the need, to manufacture the polymer. Also, as required, a molecular weight regulator such as mercaptans may also be used.

The suspension polymerization is carried out in water in which a water-soluble polymer such as polyvinyl alcohol, polyacrylates, carboxymethyl cellulose (CMC) or ethyl cellulose is dissolved as a dispersion auxiliary. The polymer is preferably manufactured by carrying out the polymerization in the condition that the monomer is dissolved in water in which a water soluble polymer obtained by radically polymerizing a reactive emulsifier as mentioned above and particularly a water-soluble polymer obtained by radically polymerizing a lithium salt of a reactive emulsifier having an anionic group is dissolved in an amount of about 0.05 to several wt %.

As the initiator, basically, an oil-soluble initiator: N,N'-azobisbutyronitrile, 2,2'-azobis(2-methylbutyronitrile), dimethyl 2,2'-azobis(2-methylpropionate) or benzoyl peroxide is used. According to the need, a water-soluble radical initiator including persulfates such as sodium persulfate, potassium persulfate, ammonium persulfate and lithium persulfate; 2,2'-azobis(1-imino-2-ethylpropane)dihydrochloride, 2,2'-azobis[2-(2-imidazoline-2-yl)propane] and 2,2-azobis[2-methyl-N-(2-hydroethyl)propionamide] is used in combination.

With regard to the condition of polymerization, the polymerization is carried out in the presence of water in an amount of 60 to 500% by weight based on the total amount of the monomers with introducing inert gas such as nitrogen gas and stirring. The polymerization is carried out by heating the system to a temperature of 50° C. to 80° C. for about 3 hours to 20 hours though the temperature differs depending on the half-life temperature of the radical initiator, and by adjusting the concentration of the polymer, the pH and the like in the system according to the need, to manufacture the polymer. Also, as required, a molecular weight regulator such as mercaptans may also be used.

As to the particle diameter of the polymer particles, it is considered that when the particle diameter is too larger than the gap between the electrode and the separator, the penetration of particles is difficult, bringing about insufficient binding effect. However, the particle diameter obtained in usual emulsion polymerization is smaller than several microns and therefore has no problem. There is the case where the particle diameter reaches 100 µm or more in suspension polymerization. In this case, it is preferable to control, for example, the type and amount of a dispersion auxiliary which will be explained later, whether to combine an emulsifier used in emulsion polymerization and stirring condition to thereby decrease the particle diameter to tens of microns or less.

In the present invention, the polymer dispersion is poured, in advance, into a container of a lithium ion secondary battery into which a positive electrode and a negative electrode are incorporated. In this case, the polymer dispersion solution is poured in such a dilute condition that the concentration of the polymer particles is 0.1 to 5.0% by weight, in an amount of 0.01 to 0.06 g as a polymer per 1 g of the positive electrode active material.

Since, usually, the dispersion of the polymer particles is supplied in a concentration of about 20 to 40% by weight, the dispersion is diluted upon use. Though the dispersion may be diluted using water, it is preferable to use a water-soluble organic solvent when a water-soluble polymer such as CMC or a latex such as SBR is used as the electrode binder of a lithium ion secondary battery because there is the case where these binders damage the electrodes.

As the water-soluble organic solvent, alcohols freely compatible with water such as methanol, ethanol and isopropanol; ketone types such as acetone and 2-butanone; glycol ether types such as 2-methoxyethanol, 2-ethoxyethanol, 2-methoxy(2-propanol) and 2-butoxyethanol; ether types such as dimethoxyethane and methoxy ethoxy ethane; cyclic ether types such as dioxane and tetrahydrofuran; γ-butyrolactone, N-methylpyrrolidone, N,N'-dimethylformamide and the like may be used. A water-insoluble solvent may also be used together if its amount is small.

Because this water-soluble solvent is removed in the subsequent drying step, it is preferably a highly volatile solvent having a relatively low boiling point. For example, methanol, ethanol, isopropanol, 2-methoxyethanol, 2-ethoxyethanol and dimethoxyethane are preferably used.

In the present invention, the emulsion or suspension solution of the polymer is made to have a polymer concentration as low as 0.1 to 5% by weight by diluting with an aqueous solvent, and the polymer has the characteristics that it retains high adhesiveness and excellent battery characteristics though it is used in an amount as extremely small as 0.01 to 0.06 g per 1 g of the positive electrode active material and poses no problem concerning, for example, swelling of the battery.

When the concentration of the polymer is designed to be as low as 0.1 to 5% by weight, a small amount of the polymer is allowed to penetrate uniformly into the gap between the electrode and the separator.

(Method of Producing a Polymer Dispersion Solution)

Though the polymer dispersion solution may be diluted using water, it is preferable to use a water-soluble organic solvent when a water-soluble polymer such as CMC (carboxymethyl cellulose) or a latex such as SBR is used as the binder for a negative electrode of a lithium ion secondary battery because there is the case where these binders damage the electrodes.

As the water-soluble organic solvent, alcohols freely compatible with water such as methanol, ethanol and isopropanol; ketone types such as acetone and 2-butanone; glycol ether types such as 2-methoxyethanol, 2-ethoxyethanol, 2-methoxy(2-propanol) and 2-butoxyethanol; ether types such as dimethoxyethane and methoxy ethoxy ether; γ-butyrolactone, N-methylpyrrolidon, N,N'-dimethylformamide and the like may be used. A water-insoluble solvent may also be used together if its amount is small.

Because this water-soluble solvent is removed in the subsequent drying step, it is preferably a highly volatile solvent having a relatively low boiling point. For example, methanol, ethanol, isopropanol, 2-methoxyethanol, 2-ethoxyethanol and dimethoxyethane are preferably used.

In the following examples, the polymer was diluted to a concentration of 1 to 10% by weight with ethanol upon use.

(Measurement of Polymer Elution Rate)

In the present invention, the polymer electrolyte fulfills its function as an adhesive. If it is eluted in an organic solvent used for the electrolyte solution such as EC and DEC, it poses problems concerning not only deteriorated adhesion, but also a reduction in reliability upon the sealing of the laminated part because the polymer gets caught in the thermally fused portion and the generation of gas caused by the decomposition of the polymer during storage at high temperatures. Therefore, when the polymer electrolyte is used as shown in the method of the present invention, it is important to lower the solubility in the electrolyte solution while securing affinity to the electrolyte solution.

Although a usual polymer is decreased insolubility in an organic solvent with an increase in its molecular weight, the polymer manufactured according to the above (Method of producing a polymer) has an excessively high molecular weight and it is therefore difficult to measure the molecular weight precisely.

According to this method for producing a polymer, a polymer which has a molecular weight of 1,000,000 or more and is scarcely eluted in an organic solvent can be manufactured. In order to define the physical property values of the polymer, the polymer is dipped in an organic solvent containing EC and DEC (EC:DEC=5:5) for 24 hours to carry out extracting treatment to define the amount of the polymer eluted in the organic solvent.

Originally, this elution rate must be defined as an elution rate for the electrolyte solution to be injected into the battery. However, a large difference in elution rate was not observed even if the composition of an electrolyte solution was changed and therefore, the elution rate was standardized by an elution rate using, as a standard, a mixture solvent of EC/DEC (=5/5).

EFFECT OF THE INVENTION

According to the present invention, the thermal shrinkage of the separator can be suppressed without deteriorating the characteristics of a battery, enabling a thinner separator to be used.

BEST MODE FOR CARRYING OUT THE INVENTION

The present invention will be explained in more detail. However, the present invention is not limited to the following examples but may be practiced by making various modifications without departing from the spirit of the present invention.

Method of Producing a Polymer

Production Example 1

Production of a Polymer P1

A 500 ml four-neck flask in which the atmosphere was substituted with nitrogen gas was charged with 4.0 g of 3,4-epoxycyclohexylmethylacrylate, 16.0 g of 3-ethyloxetanylmethacrylate, 25.0 g of methylmethacrylate, 35.0 g of n-butylacrylate, 3.0 g of lithium p-styrenesulfonate and 155 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide solution and then subjected to filtration using a 300 mesh filter screen, to obtain an emulsified polymerization solution polymer P1 having a milky white color.

The nonvolatile component of the polymer P1 after the polymer P1 was heated at 105° C. for 3 hours and dried was 34.4% by weight and the particle diameter of the polymer P1 which was measured by a laser light diffusion particle size distribution measuring device was 0.14 µm as a median diameter. A polypropylene nonwoven fabric was impregnated with the above polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 0.14% by weight.

Production Example 2

Production of a Polymer P2

A 500 ml four-neck flask in which the atmosphere was substituted with nitrogen gas was charged with 16.0 g of 3-ethyloxetanylmethacrylate, 30.0 g of methylmethacrylate, 30.0 g of n-butylacrylate, 4.0 g of diacrylate of a both terminal hydroxyl group polyester oligomer (trade name: Kayarad HX-220, manufactured by Nippon Kayaku Co., Ltd.) obtained by adding γ-caprolactone to hydroxy pivalate of neopentyl glycol to polymerize, 3.0 g of lithium p-styrenesulfonate and 155 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH.½H$_2$O) solution and then subjected to filtration using a 300 mesh filter screen, to obtain an emulsified polymerization solution polymer P2 having a milky white color.

The nonvolatile component of the polymer P2 after the polymer P2 was heated at 105° C. for 3 hours and dried was 35.3% by weight and the particle diameter of the polymer P2 which was measured by a laser light diffusion particle size distribution measuring device was 0.22 µm as a median diameter. A polypropylene nonwoven fabric was impregnated with the above polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 0.96% by weight.

Production Example 3

Production of a Polymer P3

A 500 ml four-neck flask in which the atmosphere was substituted with nitrogen gas was charged with 4.0 g of 3,4-epoxycyclohexylmethylacrylate, 16.0 g of 3-ethyloxetanylmethacrylate, 20.0 g of methylmethacrylate, 20.0 g of laurylmethacrylate, 3.0 g of lithium p-styrenesulfonate and 155 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH½H$_2$O) solution and then subjected to filtration using a 300 mesh filter screen, to obtain an emulsified polymerization solution polymer P3 having a milky white color.

The nonvolatile component of the polymer P3 after the polymer P3 was heated at 105° C. for 3 hours and dried was 34.5% by weight and the particle diameter of the polymer P3 which was measured by a laser light diffusion particle size distribution measuring device was 0.18 μm as a median diameter. A polypropylene nonwoven fabric was impregnated with the above polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 0.47% by weight.

Production Example 4

Production of a Polymer P4

A 500 ml four-neck flask in which the atmosphere was substituted with nitrogen gas was charged with 4.0 g of 3,4-epoxycyclohexylmethylacrylate, 16.0 g of 3-ethyloxetanyl-methacrylate, 25.0 g of methylmethacrylate, 35.0 g of n-butylacrylate, 4.6 g of an ethylene oxide addition polymer of alkylpropenylphenol (trade name: Aquaron RN-30, concentration: 65% by weight, manufactured by Dai-ichi Kogyo Seiyaku Co., Ltd.) and 155.0 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH.½H$_2$O) solution and then subjected to filtration using a 300 mesh filter screen, to obtain an emulsified polymerization solution polymer P4 having a milky white color.

The nonvolatile component of the polymer P4 after the polymer P4 was heated at 105° C. for 3 hours and dried was 33.5% by weight, the rate of polymerization based on the nonvolatile component was 33.5% by weight and the particle diameter of the polymer P4 which was measured by a laser light diffusion particle size distribution measuring device was 0.19 μm as a median diameter. A polypropylene nonwoven fabric was impregnated with the polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 5.11% by weight.

Production Example 5

Production of a Polymer P5

A 500 ml four-neck flask in which the atmosphere was substituted with nitrogen gas was charged with 4.0 g of 3,4-epoxycyclohexylmethylacrylate, 16.0 g of 3-ethyloxetanyl-methacrylate, 25.0 g of methylmethacrylate, 35.0 g of n-butylacrylate, 12.0 g of a sulfonate of an ethylene oxide addition polymer of alkylpropenylphenol (trade name: Aquaron HS-1025, concentration: 25% by weight, manufactured by Dai-ichi Kogyo Seiyaku Co., Ltd.) and 155.0 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH.½H$_2$O) solution and then subjected to filtration using a 300 mesh filter screen, to obtain an emulsified polymerization solution polymer P5 having a milky white color.

The nonvolatile component of the polymer P5 after the polymer P5 was heated at 105° C. for 3 hours and dried was 34.9% by weight and the particle diameter of the polymer P5 which was measured by a laser light diffusion particle size distribution measuring device was 0.13 μm as a median diameter. A polypropylene nonwoven fabric was impregnated with the polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 2.25% by weight.

Production Example 6

Production of a Polymer P6

A 500 ml four-neck flask in which the atmosphere was substituted with nitrogen gas was charged with 4.0 g of 3,4-epoxycyclohexylmethylacrylate, 31.7 g of methylmethacrylate, 44.3 g of n-butylacrylate, 3.0 g of lithium p-styrenesulfonate and 155.0 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH.½H$_2$O) solution and then subjected to filtration using a 300 mesh filter screen, to obtain an emulsified polymerization solution polymer P5 having a milky white color.

The nonvolatile component of the polymer P6 after the polymer P6 was heated at 105° C. for 3 hours and dried was 34.9% by weight and the particle diameter of the polymer P6 which was measured by a laser light diffusion particle size distribution measuring device was 0.30 µm as a median diameter. A polypropylene nonwoven fabric was impregnated with the polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 4.23% by weight.

Production Example 7

Production of a Polymer P7

A 500 ml four-neck flask in which the atmosphere was substituted with nitrogen gas was charged with 25.0 g 3,4-epoxycyclohexylmethylacrylate, 31.25 g of methylmethacrylate, 43.75 g of n-butylacrylate, 3.75 g of lithium p-styrenesulfonate and 155.0 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH.½H$_2$O) solution and then subjected to filtration using a 300 mesh filter screen, to obtain an emulsified polymerization solution polymer P7 having a milky white color.

The nonvolatile component of the polymer P7 after the polymer P7 was heated at 105° C. for 3 hours and dried was 34.4% by weight and the particle diameter of the polymer P7 which was measured by a laser light diffusion particle size distribution measuring device was 0.30 µm as a median diameter. A polypropylene nonwoven fabric was impregnated with the above polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 1.41% by weight.

Production Example 8

Production of a Polymer Q1

A 500 ml four-neck flask in which the atmosphere was substituted with nitrogen gas was charged with 20.0 g of 3-ethyloxetanylmethacrylate, 30.0 g of methylmethacrylate, 30.0 g of n-butylacrylate, 3.0 g of lithium p-styrenesulfonate and 155.0 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH.½H$_2$O) solution and then subjected to filtration using a 300 mesh filter screen, to obtain an emulsified polymerization solution polymer Q1 having a milky white color.

The nonvolatile component of the polymer Q1 after the polymer Q1 was heated at 105° C. for 3 hours and dried was 33.3% by weight and the particle diameter of the polymer Q1 which was measured by a laser light diffusion particle size distribution measuring device was 0.17 µm as a median diameter. A polypropylene nonwoven fabric was impregnated with the polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 20.83% by weight.

Production Example 9

Production of a Polymer Q2

A 500 ml four-neck flask in which the atmosphere was substituted with nitrogen gas was charged with 38.0 g of methylmethacrylate, 38.0 g of n-butylacrylate, 4.0 g of diacrylate of both terminal hydroxyl group polyester oligomer (trade name: Kayarad HX-220, manufactured by Nippon Kayaku Co., Ltd.) obtained by adding γ-caprolactone to hydroxy pivalate of neopentyl glycol to polymerize, 3.0 g of lithium p-styrenesulfonate and 155.0 g of ion exchange water. Nitrogen gas was introduced into the flask and the mixture was stirred and heated to raise the temperature of the mixture. After the temperature of the mixture reached about 60° C., 0.2 g of ammonium persulfate and 0.1 g of lithium hydroxide (LiOH.½H$_2$O) which were dissolved in 5.0 g of ion exchange water was added to the mixture, which was then stirred under heating continuously and heated to 75° C. while taking care of exothermic change, to continue a polymerization reaction with keeping a temperature of 75° C.

After 10 to 20 minutes, the mixture changed in milky white in its color and entered into a polymerization reaction. The reaction was continued for 3 hours while keeping this condition. 0.1 g of ammonium persulfate which was dissolved in 2.0 g of ion exchange water was added to the mixture, which was further reacted continuously at 75° C. for 2 hours to complete the polymerization. Then, the reaction mixture was cooled to 30 to 40° C., neutralized to pH 6 to 8 by using a 1 wt % lithium hydroxide (LiOH.½H$_2$O) solution and then subjected to filtration using a 300 mesh filter screen, to obtain an emulsified polymerization solution polymer Q2 having a milky white color.

The nonvolatile component of the polymer Q2 after the polymer Q2 was heated at 105° C. for 3 hours and dried was 34.3% by weight and the particle diameter of the polymer Q2 which was measured by a laser light diffusion particle size distribution measuring device was 0.21 µm as a median diameter. A polypropylene nonwoven fabric was impregnated with the polymer, dried at 100° C. by hot air for 30 minutes, dipped in a mixture solvent of ethylene carbonate and diethyl carbonate (=50/50, weight ratio) for 24 hours and dried at 105° C. under reduced pressure for 5 hours to measure the elution rate. The elution rate was 1.84% by weight.

The proportions of the monomers and the like in the polymers P1 to P7 and Q1 and Q2 are shown in Table 1. The unit is g. The elution rate is also shown. The symbols in Table 1 are as follows.

CEM: 3,4-Epoxycyclohexylmethylacrylate
OXM: 3-Ethyloxetanylmethacrylate
MMA: Methylmethacrylate
n-BA: n-butylacrylate
LMA: Laurylmethacrylate
TCDM: Tricyclo[5·2·1·0$^{2,0}$] decanylmethacrylate, trade name: FA-513M (manufactured by Hitachi Chemical Co., Ltd.)
HX220: Diacrylate of both terminal hydroxyl group polyester oligomer obtained by adding γ-caprolactone to hydroxy pivalate of neopentyl glycol to polymerize (trade name: Kayarad HX-220, manufactured by Nippon Kayaku Co., Ltd.)
Liss: Lithium p-styrenesulfonate
NR-1: Ethylene oxide addition polymer of alkylpropenylphenol, concentration: 65% by weight, trade name: Aquaron RN-30 (Dai-ichi Kogyo Seiyaku Co., Ltd.)
Ar-2: Sulfonate of ethylene oxide addition polymer of alkylpropenylphenol, concentration: 25% by weight, trade name: Aquaron HS-1025 (Dai-ichi Kogyo Seiyaku Co., Ltd.)

In conventional technologies, for example, the processes described in the foregoing Patent References, cationic crosslinking polymers are used. All these technologies are utilized on the premise that a polymer dissolved in an electrolyte solution (its solvent) is used. This reason is that because the electrolyte solution in the battery is all gelled, the polymer dissolved in the electrolyte solution in advance is crosslinked to form a gel or because the polymer is applied to a separator, the polymer must be liquefied into a solution. The present invention is characterized by the process in which a polymer which is scarcely dissolved in a solvent is made to undergo radical emulsion polymerization or radical suspension polymerization upon use.

A comparison between the polymers P1, P6, P7 and Q1 of the present invention reveals that:

(Q1) has a large elution rate (20.83% by weight) even if it contains a monomer having an oxetanyl group;

(P1) contains an oxetanyl group and does not contain C components other than an alicyclic epoxy, but has an elution rate (1.83%) limited to a low level; and (P6, 7) does not contain C components other than an alicyclic epoxy, but has an elution rate (4.23, 1.41% by weight) limited to a low level; and

TABLE 1

| | | Production Ex. No. | | | | | | | | |
|---|---|---|---|---|---|---|---|---|---|---|
| | | Example | | | | | | | Comparative Example | |
| | | 1 | 2 | 3 | 4 | 5 | 6 | 7 | 8 | 9 |
| | | Polymer No. and Structure | | | | | | | | |
| Component | | P1 (ABD) | P2 (ABCD) | P3 (ABCD) | P4 (ABD) | P5 (ABD) | P6 (ABD) | P7 (ABD) | Q1 (ABD) | Q2 (BCD) |
| A | CEM | 4.0 | | 4.0 | 4.0 | 4.0 | 4.0 | 20 | | X |
| | OXM | 16.0 | 16.0 | 16.0 | 16.0 | 16.0 | | | 20.0 | X |
| B | MMA | 25.0 | 30.0 | 20.0 | 25.0 | 25.0 | 31.7 | 25 | 30.3 | 29.0 |
| | n-BA | 35.0 | 30.0 | | 35.0 | 35.0 | 44.3 | 35 | 30.0 | 38.0 |
| C | LMA | | | 20.0 | | | | | | |
| | HX220 | | 4.0 | | | | | | | 4.0 |
| D | Liss | 3.0 | 3.0 | 3.0 | | | 3.0 | 3.0 | 3.0 | 3.0 |
| | NR-1 | | | | 4.6 | | | | | |
| | AR-2 | | | | | 12.0 | | | | |
| | Reaction Solvent and the Like | 162.4 | 162.4 | 162.4 | 162.4 | 162.4 | 162.3 | 162.3 | 162.4 | 162.4 |
| | Elution Rate (wt %) | 1.83 | 0.96 | 0.47 | 5.11 | 2.25 | 4.23 | 1.41 | 20.83 | 1.84 |

The amount of each polymer to be eluted is shown collectively in Table 2.

TABLE 2

| | Polymer | | | | |
|---|---|---|---|---|---|
| | P1 of Present Invention | P2 of Present Invention | P3 of Present Invention | P4 of Present Invention | P5 of Present Invention |
| Elution Rate (wt %) | 1.83 | 0.96 | 0.47 | 5.11 | 2.25 |

| | Polymer | | | |
|---|---|---|---|---|
| | P6 of Present Invention | P7 of Present Invention | Comparative Q1 | Comparative Q2 |
| Elution Rate (wt %) | 4.23 | 1.41 | 20.83 | 1.84 | it can be confirmed that elution in a solvent is limited by the presence of an alicyclic epoxy group. It is considered that a crosslinking reaction resulting from ring opening of an alicyclic epoxy group is no doubt run. It is therefore considered that alicyclic epoxy which is the component (A) partly functions as the component (C) singularly.

The detail of the reason why a monomer having an alicyclic epoxy group is (partially) crosslinked by radical emulsion polymerization or radical suspension polymerization is not clarified. It is inferred that a part of alicyclic epoxy groups are ring opening polymerized (crosslinked) by radical polymerization in the presence of water. The ring-opening-polymerized (crosslinked) alicyclic epoxy group is not produced enough to observe its presence by infrared absorption spectrum analysis and the ratio of the polymerized alicyclic epoxy group is considered to be small. It has been confirmed that a monomer having an oxetanyl group scarcely undergoes ring-opening polymerization because the elution rate of the polymer produced in the same condition is large. It is considered that an oxetane ring has a smaller ring strain energy than an epoxy ring and therefore scarcely undergoes ring-opening polymerization.

In the case of the polymer P3 of the present invention, a monomer containing an oxetanyl group, an alicyclic epoxy and a higher alkyl monomer are polymerized and in the case of the polymer P6 of the present invention, an alicyclic epoxy is polymerized, whereby the elution rate in a EC/DEC solvent is 5% or less, exhibiting good adhesion. Because a radically polymerizable polymer containing an oxetanyl group scarcely undergoes a reaction forming a crosslinked portion in its molecule singly and it is therefore necessary to combine an alicyclic epoxy monomer or a polyfunctional radically polymerizable monomer.

Also, the polymers P1, 4 and 5 of the present invention which had the same monomer composition used different emulsifiers. If any of these emulsifies is used, the elution rate was 3% or less. As the reaction initiator, water soluble radical initiators including persulfates such as sodium persulfate, potassium persulfate, ammonium persulfate and lithium persulfate; 2,2'-azobis(1-imino-2-ethylpropane)dihydrochloride, 2,2'-azobis[2-(2-imidazoline-2-yl)propane], 2,2-azobis[2-methyl-N-(2-hydroethyl)propionamide] and the like are used in an amount of about 0.01 to several wt % based on the total amount of the monomers. Also, according to the need, an oil-soluble radical initiator such as N,N'-azobisisobutyronitrile and benzoyl peroxide may be used in combination. As the emulsifier, various usual surfactants including anionic types such as alkyl sulfate, alkylbenzene sulfate and alkylnaphthalene sulfate; and nonionic types such as polyoxyethylene alkyl ether and polyoxyethylene alkylphenol ether and in addition, compounds having a radically polymerizable group and an anionic hydrophilic group or a nonionic hydrophilic group and called a reactive emulsifier having a radically polymerizable group, alkali metal or ammonium salts of sulfoethylmethacrylate, alkali metal or ammonium salts of sulfoethylacrylate, alkali metal or ammonium salts of P-styrenesulfonic acid, polyethylene glycol methacrylate and polyethylene glycol acrylate may be used. It is, however, preferable to use the reactive emulsifier. Among these emulsifiers, an anionic reactive emulsifier in which the anionic group is a lithium salt is more preferably used and these reactive emulsifiers are used in an amount of about 0.1 to 20% by weight. It is generally known that even if the same monomer composition is used, the structure and molecular weight of the polymer differ depending on the amount and type of the polymerization initiator. Though the polymers P1, P4 and P5 of the present invention had the same monomer composition, each polymer was synthesized using a different reactive initiator. All of these initiators developed a binding effect. When among these initiators, lithium p-styrenesulfonate was used, particularly excellent characteristics were exhibited. Among these initiators, lithium p-styrenesulfonate was preferably used in consideration of not only the elution rate but also an influence on battery characteristics. As to the alkali metal, it is preferably Li in consideration of, for example, dissolution and a hindrance to charge-discharge in a battery.

Though the comparative polymer Q1 contains an oxetanyl group, this group is not partially crosslinked in the polymer. Therefore, when the electrolyte solution is poured, the polymer is dissolved in the electrolyte solution before crosslinked by cationic polymerization and therefore sufficient binding effect is scarcely developed.

The comparative polymer Q2 failed to produce a binding effect though the elution rate is limited to a level as low as 1.84. Therefore, the polymer is unsatisfied by only limiting the elution rate to a low level and it is considered that it is necessary contain a cationic polymerizable group.

Also, the proportions of monomers in each polymer are shown in Table 3. In Table 3, the proportion of each monomer is expressed by wt %.

TABLE 3

| | | Example (Polymer No.) | | | | | | | | |
|---|---|---|---|---|---|---|---|---|---|---|
| | | P1 | P2 | P3 | P4 | P5 | P6 | P7 | Comp. Q1 | Comp. Q2 |
| A | CEM | 4.8 | | 6.4 | 4.7 | 4.4 | 4.8 | 24.1 | | |
| | OXM | 19.3 | 19.3 | 25.4 | 18.9 | 17.4 | | | 24.0 | |
| B | B | 72.3 | 72.3 | 31.7 | 71.0 | 65.2 | 91.6 | 72.3 | 72.4 | 90.5 |
| C | HX220 | | 4.8 | | | | | | | 5.4 |
| | CEM | (4.8) | | (6.4) | (4.7) | (4.4) | (4.8) | (24.1) | | |
| | LMA | | | 31.7 | | | | | | |
| D | D | 3.6 | 3.6 | 4.8 | 5.4 | 13.0 | 3.6 | 3.6 | 3.6 | 4.1 |

Using the above polymers P1 to P7 and the polymers Q1 and Q2, lithium secondary batteries were produced. The production of the positive electrode and the negative electrode, the preparation of the nonaqueous electrolyte solution and the fabrication of the battery were carried out in the following manner.

(Production of a Positive Electrode)

In the production of the positive electrode, lithium cobaltate as a carbon conductive agent, SP300 and acetylene black were mixed in a ratio by mass of 92:3:2 to make a positive electrode composite powder, which was then filled in an amount of 200 g in a mixer (for example, Mechanofusion Device (AM-15F), manufactured by Hosokawa Micron Corporation). This mixer was made to operate at a rotation of 1500 rpm for 10 minutes to cause compression, impact and shearing actions, thereby mixing the powder to form a positive electrode composite material. Then, a fluorine type resin binder (PVDF) was mixed with the positive electrode composite material in a ratio by mass of 97:3 in a NMP solvent to make a positive electrode composite slurry, which was then applied to both surfaces of an aluminum foil, dried and then rolled to make an electrode plate. In the above procedures, the mixing in the Mechanofusion device unnecessarily conducted, and the raw materials may be mixed in a slurry state as it is or may be mixed using other methods.

Here, lithium cobaltate was used as the positive electrode active material. However, the positive electrode active material is not limited to lithium cobaltate but may be a lithium-nickel complex oxide typified by spinel type lithium manganate or lithium nickelate or an olivine type phosphoric acid compound.

The positive electrode had a size of 380.0 mm×52.0 mm and the active material coating parts on the front and back surfaces had a size of 339.0 mm×50.0 mm and a size of 271.0 mm×50.0 mm, respectively. The amount of coating was 382 mg/10 cm² (excluding the weight of the core body), the weight of the electrode was 5.83 g and the weight of the active material was 5.36 g.

(Production of a Negative Electrode)

In the production of the negative electrode, a carbon material (graphite), CMC (sodium carboxymethyl cellulose) and SBR (styrene butadiene rubber) were mixed in a ratio by mass of 98:1:1 in an aqueous solution. The obtained solution was applied to both surfaces of a copper foil, then dried and rolled to make an electrode plate. Here, though a general negative electrode active material was used, any material including graphite, cokes, tin oxide, metal lithium, silicon or a mixture of these materials may be used without any problem insofar as it can introduce and dissociate lithium ions.

The negative electrode had a size of 347.0 mm×52.0 mm and the active material coating parts on the front and back surfaces had a size of 347.0 mm×52 mm and a size of 289.0 mm×52.0 mm, respectively. The amount of coating was 171 mg/cm² (excluding the weight of the core body), the weight of the electrode was 2.83 g and the weight of the active material was 2.61 g.

(Preparation of a Nonaqueous Electrolyte Solution)

As the electrolyte solution, a solution was used in which $LiPF_6$ was used in a proportion of 1.0 mol/l and a solvent constituted of EC and DEC (3:7 by volume) were dissolved and mixed. The electrolyte solution is not particularly limited to that used in this example. Examples of the Li salt include $LiBF_4$, $LiPF_6$, $LiN(SO_2CF_3)_2$, $LiN(SO_2C_2F_5)_2$, and $LiPF_{6-x}(C_nF_{2n+1})_x$ (wherein $1 \leq x \leq 6$ and n=1 or 2). These compounds may be used either singly or by mixing two or more. The concentration of the support salt is preferably 0.8 to 1.5 mol per 1 L of the electrolyte solution though no particular limitation is imposed on it. Also, as the type of solvent, a carbonate type solvent such as EC, PC, GBL, DEC, EMC and DMC are preferable and a combination of a cyclic carbonate and a chain carbonate is more preferable. The details of a gel polymer electrolyte will be explained in the following examples and comparative examples.

(Fabrication of a Battery)

As to the structure of the battery, lead terminals were attached to the positive and negative electrodes, respectively and spirally wound through the separator to form a coil-like material, which was crushed into the flat form by pressing to form an electrode body, which was incorporated into a battery outer package obtained using an aluminum laminate and the electrolyte solution was injected into the battery, followed by sealing the package to make a test battery. The design capacity of this battery is 780 mAh.

(Battery T1 of the Present Invention)

The polymer P1 obtained in the method 1 of producing a polymer was diluted with ethanol such that the solid concentration was 2% by weight to prepare a polymer dispersion. Positive and negative electrodes manufactured according to the above production method were spirally wound through the polyethylene separator to form a coil-like material, which was incorporated into a battery outer package obtained using an aluminum laminate as a battery outer package. Then, 3 ml of the polymer dispersion was injected into the battery to repeat an impregnation process of retaining for 5 minutes under ⅓ atom, twice. Then, after an excess polymer dispersion was removed, the battery was subjected to vacuum drying carried out at 105° C. for 2.5 hours in the condition that it was fastened with a cramp. Then, the electrolyte solution was injected into the battery placed in a dry box under a nitrogen atmosphere, to manufacture a battery T1 according to the present invention.

(Battery T2 of the Present Invention)

A battery T2 of the present invention was manufactured in the same method as in the production of the battery T1 of the present invention except that 3 ml of a polymer dispersion obtained by diluting the polymer P1 obtained in Production Example 1 such that the solid concentration was 3% by weight was injected.

(Battery T3 of the Present Invention)

A battery T3 of the present invention was manufactured in the same method as in the production of the battery T1 of the present invention except that 3 ml of a polymer dispersion obtained by diluting the polymer P1 obtained in Production Example 1 such that the solid concentration was 5% by weight was injected.

(Battery T4 of the Present Invention)

A battery T4 of the present invention was manufactured in the same method as in the production of the battery T1 of the present invention except that 3 ml of a polymer dispersion obtained by diluting the polymer P2 obtained in Production Example 2 such that the solid concentration was 2% by weight was injected.

(Battery T5 of the Present Invention)

A battery T5 of the present invention was manufactured in the same method as in the production of the battery T1 of the present invention except that 3 ml of a polymer dispersion obtained by diluting the polymer P3 obtained in Production Example 3 such that the solid concentration was 2% by weight was injected.

(Battery T6 of the Present Invention)

A battery T6 of the present invention was manufactured in the same method as in the production of the battery T1 of the present invention except that 3 ml of a polymer dispersion obtained by diluting the polymer P4 obtained in Production Example 4 such that the solid concentration was 2% by weight was injected.

(Battery T7 of the resent invention)

A battery T7 of the present invention was manufactured in the same method as in the production of the battery T1 of the present invention except that 3 ml of a polymer dispersion obtained by diluting the polymer P5 obtained in Production Example 5 such that the solid concentration was 2% by weight was injected.

(Battery T8 of the Present Invention)

A battery T7 of the present invention was manufactured in the same method as in the production of the battery T1 of the present invention except that 3 ml of a polymer dispersion obtained by diluting the polymer P6 obtained in Production Example 6 such that the solid concentration was 2% by weight was injected.

(Battery T9 of the Present Invention)

A battery T9 of the present invention was manufactured in the same method as in the production of the battery T1 of the present invention except that 3 ml of a polymer dispersion obtained by diluting the polymer P7 obtained in Production Example 7 such that the solid concentration was 2% by weight was injected.

(Comparative Battery R1)

Positive and negative electrodes manufactured according to the above production method were spirally wound through the polyethylene separator to form a coil-like material, which was incorporated into an aluminum laminate outer package. Then, the outer package was dried at 105° C. under vacuum for 2.5 hours and then, an electrolyte solution was injected into the battery placed in a dry box under a nitrogen atmosphere, to manufacture a comparative battery R1.

(Comparative Battery R2)

Tripropylene glycol diacrylate (having a molecular weight of about 300) was mixed with an electrolyte solution (1.0 M LiPF$_6$, EC/DEC=3/7) in a ratio by mass of 1:18 and 3000 ppm oft-hexyl peroxypivalate was added as an initiator to the mixture solution, which was then injected (4 ml) into a battery manufactured in the same manner as in the production of the comparative battery R1 and then, heated at 60° C. for 3 hours to carryout curing treatment, thereby manufacturing a comparative battery R2.

(Comparative Battery R3)

The surface of a positive electrode manufactured according to the foregoing production method was coated with a solution obtained by dissolving polyvinylidene fluoride (PVDF) in THF such that the concentration of the PVDF was 5% by weight. Then, the electrode was wound in a wet system and the electrode was dried under vacuum at 105° C. for 2.5 hours in the condition that it was fastened with a cramp. Thereafter, the same method as in the production of the comparative battery R1 was carried out to manufacture a comparative battery R3.

(Comparative Battery R4)

Positive and negative electrodes manufactured according to the above production method were spirally wound through the polyethylene separator to form a coil-like material, which was incorporated into an aluminum laminate outer package. Then, 4 ml of an electrolyte solution was injected into the battery and curing treatment was carried out at 60° C. for 12 hours, to manufacture a comparative battery R4.

As the electrolyte solution, (1) an electrolyte solution (no Li electrolyte, EC/DEC=3/7) was used which had a molecular weight of about 400,000 (no intermolecular crosslinking) and was obtained by copolymerizing a radically polymerizable monomer containing an oxetanyl group with an acrylic monomer was mixed with (2) an electrolyte solution (EC/DEC=3/7) blended with LiPF$_6$, wherein these electrolyte solutions were adjusted such that the concentration of LiPF$_6$ was 1.0 M and the ratio by mass of the electrolyte solution to the polymer was 60:1 just before injected into the battery. Because a polymer of this type undergoes a crosslinking reaction thanks to the effect of LiPF$_6$ as an initiator, it is necessary to blend the polymer-containing electrolyte (1) with the Li electrolyte-containing electrolyte solution (2) just before these electrolyte solutions are added.

(Comparative Battery R5)

The surface of a negative electrode manufactured according to the foregoing production method was coated with a polymer dispersion obtained by diluting the polymer P1 obtained in Production Example 1 such that the concentration of the polymer was 5% by weight and then, the electrode was dried. Thereafter, the same method as in the production of the comparative battery R1 was carried out to manufacture a comparative battery R5.

(Comparative battery R6)

A comparative battery R6 was manufactured in the same method as in the production of the battery T1 of the present invention except that 3 ml of a polymer dispersion obtained by diluting the polymer P1 obtained in Production Example 1 such that the solid concentration was 1% by weight was injected.

(Comparative battery R7)

A comparative battery R7 was manufactured in the same method as in the production of the battery T1 of the present invention except that 3 ml of a polymer dispersion obtained by diluting the polymer P1 obtained in Production Example 1 such that the solid concentration was 10% by weight was injected.

(Comparative Battery R8)

A comparative battery R8 was manufactured in the same method as in the production of the battery T1 of the present invention except that 3 ml of a polymer dispersion obtained by diluting the polymer Q1 obtained in Production Example 7 such that the solid concentration was 2% by weight was injected.

(Comparative Battery R9)

A comparative battery R9 was manufactured in the same method as in the production of the battery T1 of the present invention except that 3 ml of a polymer dispersion obtained by diluting the polymer Q2 obtained in Production Example 8 such that the solid concentration was 2% by weight was injected.

(Evaluation of a Battery)

Charging Test

A constant current charging was carried out under a 1C (750 mA) current until the battery charged up to 4.2 V and charging was continued at a constant voltage of 4.2 V until the current was C/20 (37.5 mA).

Discharging Test

Constant current discharging was carried out under a 1C (750 mA) current until the battery discharged to 2.75 V.

Suspension

The interval between the charging test and the discharging test was 10 min.

(Evaluation of a Resistance to Short Circuits)

The temperature of the battery which was allowed to discharge up to 2.75 V was raised at intervals of 10° C. from 120° C. to 160° C. through a retention time of 10 minutes at each temperature to confirm whether a short circuit was developed or not by measuring the voltage of the battery, with the intention of confirming an improvement in thermal resistance due to the effect of the action of the battery of the present invention. When the separator shrinks, leading to a loss of interelectrode insulation, a sharp drop in voltage is observed. Therefore, in this method, the adhesive effect of the polymer electrolyte may be evaluated by measuring the adhesion between the separator and the electrodes.

(Evaluation of Charged Storage Characteristics)

The produced battery was allowed to charge and discharge in one cycle in the above charge-discharge condition and then allowed to charge again up to 4.2 V, to measure the thickness of the battery. The battery put in a charged state was allowed to stand in a thermostatic chamber having a 80° C. atmosphere to measure the thickness of the battery after 4 days. When the decomposition of the polymer or electrolyte appears, the battery is seen to swell due to the decomposed gas. Therefore, the reactivity at high temperatures of the battery was evaluated based on the degree of swelling of the battery.

(Evaluation of Discharge Load Characteristics)

The produced battery was allowed to charge and discharge in one cycle in the above charge-discharge condition and then allowed to charge again up to 4.2 V and to discharge under a current of 3C (2250 mA), to calculate the discharge capacity. The capacity during 1C discharging was compared with the capacity during 3C discharging to calculate a discharge efficiency of 3C/1C, thereby evaluating a high-rate discharge performance.

TABLE 4

| | Load Characteristics 3 C/1 C % | Resistance to Short Circuits Limit Temp. ° C. | 80° C. - 4 Days Charged Storage Swelling of Battery mm |
|---|---|---|---|
| Battery T1 of Present Invention | 92.2 | 160 | 0.252 |
| Comparative Battery R1 | 93.4 | 130 | 0.460 |
| Comparative Battery R2 | 68.1 | 160 | 0.216 |
| Comparative Battery R3 | 81.2 | 160 | 0.336 |
| Comparative Battery R4 | 71.4 | 160 | 0.707 |
| Comparative Battery R5 | 89.3 | 135 | 0.472 |

<Evaluation of the Adhesion of the Polymer>

The battery T1 of the present invention and the comparative batteries R1 to R5 were subjected to a test to evaluate a resistance to short circuits. The results are shown in Table 4 and FIG. 1.

Figure 1:
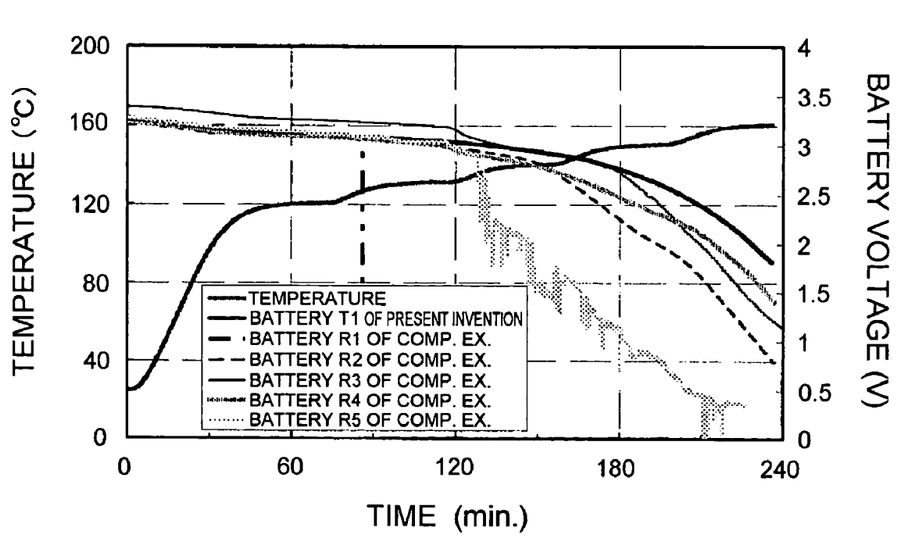
FIG. 1 is a view showing the result of a resistance to short circuits in a battery T1 according to the present invention and comparative batteries R1 to R5.

In the comparative battery R1 to which no polymer is added, short circuits across the positive and negative electrodes are developed caused by thermal shrinkage of the separator at 130° C. On the other hand, in the comparative batteries R2 to R4 using various gel polymers, the electrodes are bound with the separator by the gel electrolyte, which improves a resistance to short circuits. However, a polymer layer having low conductivity is present on the entire surface of the electrodes and also, the electrolyte solution is all gelled and therefore a deterioration in discharge performance is significant. In the case of the battery T1 of the present invention, on the contrary, the same high resistance to short circuits as in the case of current technologies could be obtained without any deterioration in discharge performance. It is considered that since the polymer is injected in the situation where the electrodes are in contact with the separator, the electrodes are bound with the separator before the polymer penetrates into the electrolyte since the polymer is not eluted in the electrolyte solution with the result a good binding effect is developed when the polymer is used even in a small amount. Also, in the case of the comparative battery R5 obtained in a different production method, an improvement in a resistance to short circuits could not be confirmed though the same polymer was used. It is considered that when the polymer is applied to the surface of the negative electrode, the polymer penetrates into the battery and it is difficult that the polymer layer on the surface of the electrode which layer is required to bind the both is formed.

In the case of the polymer having an oxetanyl group, lithium ions contained in $LiPF_6$ and $LiBF_4$ catalytically act to make the crosslinked portion progress in cation polymerization, so that the bonds between the polymers are made firmer. Though the polymer develops a certain level of adhesiveness when ethanol is removed since it has a large molecular weight, the aforementioned cationic polymerization proceeds by high-temperature aging after the electrolyte solution is injected and the polymer is more strengthened in adhesion, whereby high adhesion can be developed even if the polymer is used in a very small amount. Also, because the catalyst that initiates the cationic polymerization is a Li electrolyte necessary for the battery, any initiator particularly having an adverse influence on the performance of the battery is never added. As the Li electrolyte that starts cationic polymerization, $LiPF_6$ and $LiBF_4$ are preferable. Other electrolytes have been found to have no function as a polymerization initiator as a result of examinations and it is therefore necessary to contain $LiPF_6$ and $LiBF_4$ in a small amount inside of the battery.

<Discharge Characteristics>

As to the load characteristics, as shown Table 4, the comparative battery R1, the inside of which is completely filled with the electrolyte solution exhibits most excellent performance. With an increase in the degree of gelation inside of the battery, the discharge performance at a high rate is more deteriorated. When a trend towards high capacity is more increased, it is considered that the reduction in high-rate discharge performance will be significant. The fully gelled type batteries such as the comparative Examples R2 and R4 are considered to be unsuitable in this sense. Also, the comparative battery R3 tends to be deteriorated in discharge performance because the polymer somewhat penetrates into the battery in relation to the coating of PVDF in a wet system. In order to secure the adhesion between the separator and the electrodes, the polymer is required in a certain level of amount and therefore, PVDF which is not a type which is crosslinked in a battery must have a somewhat higher molecular weight and a composition that is easily gelled. There is a tendency that it is difficult to satisfy both the adhesion and discharge characteristics in this sense. The polymer in the battery T1 of the present invention is a type which is crosslinked in a battery and can secure the adhesion even in a small amount and it is therefore possible to satisfy both the discharge performance and the adhesion. This reason is that since only the electrode and the separator are bound and the electrolyte around the electrode and the separator is not gelled, the electrolyte solution is freely moved and therefore, ionic conductivity is not damaged.

<Storage Characteristics>

As shown in Table 4, the batteries having higher adhesion than the comparative battery R1 are reduced in excess electrolyte solution which reacts with the electrode and is therefore reduced in the generation of decomposed gas. The bound part obtained by polymerization of an oxetanyl group of the comparative battery R4 which is a battery using an oxetane type fully gelled type polymer tends to be weak in the oxidation during charged storage and the generation of gas tends to be increased by the decomposition of this part. Polymer electrolytes of this type are used in, for example, JP-A No. 2003-142158, JP-A No. 2002-110245 and JP-A No. 2004-185920. However, better adhesiveness cannot be obtained because the polymer is eluted in the electrolyte solution. Though the polymer having an oxetanyl group is contained in the battery T1 of the present invention and the comparative battery R5, this polymer is different from the fully gelled type polymer and is reduced in the number of oxetanyl groups and also in the amount of the polymer itself to be added, showing that adverse influences of the generation of gas are outstandingly improved.

<Comparison of the Amount to be Added in a Battery>

For the purpose of finding the optimum amount of the polymer to be added, the batteries T1 to T3 of the present invention and the comparative batteries R1, R6 and R7 were subjected to tests to measure a resistance to short circuits, load characteristics and charged storage characteristics. The results are shown in Table 5.

TABLE 5

| | Load Characteristics 3 C/1 C % | Resistance to Short Circuits Limit Temp. ° C. | 80° C. - 4 Days Charged Storage Swelling of Battery mm |
|---|---|---|---|
| Battery T1 of Present Invention | 92.2 | 160 | 0.252 |
| Battery T2 of Present Invention | 88.0 | 160 | 0.249 |
| Battery T3 of Present Invention | 80.5 | 160 | 0.250 |

TABLE 5-continued

|  | Load Characteristics 3 C/1 C % | Resistance to Short Circuits Limit Temp. ° C. | 80° C. - 4 Days Charged Storage Swelling of Battery mm |
|---|---|---|---|
| Comparative Battery R1 | 93.4 | 130 | 0.460 |

TABLE 5-continued

|  | Load Characteristics 3 C/1 C % | Resistance to Short Circuits Limit Temp. ° C. | 80° C. - 4 Days Charged Storage Swelling of Battery mm |
|---|---|---|---|
| Comparative Battery R6 | 93.6 | 137 | 0.332 |
| Comparative Battery R7 | 69.5 | 160 | 0.435 |

In the comparative battery R6 decreased in the amount of the polymer to be added, the amount of the polymer existing at the interface between the separator and the electrodes was insufficient and only insufficient resistance to short circuits could be obtained. In order to develop a binding effect, it is necessary to use a polymer dispersion diluted to a concentration of 2% by weight or more. As a result of analysis, it was found that the amount of the polymer contained in the battery in this case was 0.01 g per 1 g of the positive electrode active material.

Also, though the binding effect is improved when the amount of the polymer is increased, the comparative battery R7 is significantly deteriorated in load characteristics. When evaluation is made based on, as the standard, the load characteristics of the comparative battery R3 which is the foregoing PVDF type polymer battery, the amount of the polymer to be added is up to 5% by weight in terms of the concentration of a diluted solution as an amount making possible to develop a more excellent performance. This amount is preferably the upper limit of the amount of the polymer to be added. As a result of analysis, it was found that the amount of the polymer contained in the battery in this case was 0.06 g per 1 g of the positive electrode active material.

From the above results, the amount of the polymer to be added is preferably 0.01 to 0.06 g per 1 g of the positive electrode active material. It is to be noted that though the amount of the polymer is preferably based originally on the concentration of the electrolyte solution, it was calculated based on the amount of the positive electrode active material which was a standard in the battery because this battery had a difficulty in defining the amount of the electrolyte solution in light of productivity.

Next, the batteries T4 to T9 of the present invention and the comparative batteries R8 and R9 which were produced using these polymers were subjected to tests to examine a resistance to short circuits, load characteristics and storage characteristics. The results are shown in Table 6.

TABLE 6

|  | Laminate Sealing Characteristics | Load Characteristics 3 C/1 C % | Resistance to Short Circuits Limit Temp. ° C. | 80° C. Charged Storage Swelling of Battery mm |
|---|---|---|---|---|
| Battery T4 of Present Invention | ○ | 87.0 | 160 | 0.375 |
| Battery T5 of Present Invention | ○ | 85.6 | 160 | 0.418 |
| Battery T6 of Present Invention | ○ | 83.6 | 160 | 0.236 |
| Battery T7 of Present Invention | ○ | 90.4 | 160 | 0.236 |
| Battery T8 of Present Invention | ○ | 90.7 | 160 | 0.395 |
| Battery T9 of Present Invention | ○ | 89.8 | 160 | 0.250 |
| Comparative Battery R8 | X | 84.2 | 148 | 0.555 |
| Comparative Battery R9 | ○ | 92.4 | 138 | 0.389 |

In the batteries T4 to T9 of the present invention, no short was confirmed until 160° C. and it was therefore confirmed that they had a high resistance to short circuits. This coincides with the result of the elution rate shown in Table 6. It was confirmed to be necessary that the elution rate be 10% by weight or less to secure the resistance to short circuits caused by low adhesion. Also, though the comparative battery R8 is superior in a resistance to short circuits, it is increased in the elution rate of the polymer, so that the polymer is eluted in the electrolyte solution. Therefore, when the battery is sealed by thermal fusion, the polymer gets caught in the sealed portion, which significantly deteriorates the sealing ability of the laminate. Also, the generation of gas when stored after the battery charged was increased by the decomposition of the polymer eluted in the electrolyte solution. It was clarified from this fact that it is necessary to decrease the elution rate to reduce the generation of gas after the battery was charged and stored. On the other hand, in the comparative battery R9 using the polymer Q2 containing no cationic polymerizable group though having a small elution rate, binding effect was not obtained. From this fact, it is necessary to contain a cationic polymerizable group in the polymer to develop the binding affect.

What is claimed is:

1. A lithium ion secondary battery comprising a positive electrode, a negative electrode, a separator disposed between said positive electrode and said negative electrode and an electrolyte solution, wherein;
   a polymer is disposed between said positive electrode or said negative electrode and said separator, said polymer being obtained by cationic polymerization of a first polymer:
      comprising (A) a monomer unit having cationic polymerization ability, (B) a monomer unit imparting affinity to said electrolyte solution, (C) a monomer unit imparting poor solubility in said electrolyte solution and (D) a monomer unit containing an anionic or nonionic hydrophilic group;

being obtained by radical polymerization based on emulsion polymerization or suspension polymerization; and having an elution rate of 10% by weight or less in a mixture solvent of ethylene carbonate (EC) and diethyl carbonate (DEC) having a weight ratio of EC:DEC=5:5, the elution rate being defined by the following equation:

Elution rate (wt %)=(Weight of the first polymer eluted in the mixture solvent/Weight of the total first polymer)×100.

2. The lithium ion secondary battery according to claim 1, wherein the amount of said polymer is 1 to 6% by weight based on the positive electrode active material contained in said positive electrode.

3. A lithium ion secondary battery comprising a positive electrode, a negative electrode, a separator disposed between said positive electrode and said negative electrode and an electrolyte solution, wherein;

a polymer is disposed between said positive electrode or said negative electrode and said separator, said polymer being obtained by cationic polymerization of a first polymer:

comprising (A) a monomer unit having cationic polymerization ability, (B) a monomer unit imparting affinity to said electrolyte solution and (D) a monomer unit containing an anionic or nonionic hydrophilic group;

being obtained by radical polymerization based on emulsion polymerization or suspension polymerization; and having an elution rate of 10% by weight or less in a mixture solvent of ethylene carbonate (EC) and diethyl carbonate (DEC) having a weight ratio of EC:DEC=5:5, the elution rate being defined by the following equation, and being provided by forming at least a part of the monomer unit (A) through a radical polymerization of a radically polymerizable monomer having an alicyclic epoxy group, and by containing the radically polymerizable monomer having an alicyclic epoxy group when radically polymerized:

Elution rate (wt %)=(Weight of the first polymer eluted in the mixture solvent/Weight of the total first polymer)×100.

4. The lithium ion secondary battery according to claim 3, wherein the amount of said polymer is 1 to 6% by weight based on the positive electrode active material contained in said positive electrode.

* * * * *